(12) United States Patent
Tamura

(10) Patent No.: US 8,215,431 B2
(45) Date of Patent: Jul. 10, 2012

(54) SMALL VEHICLE MOUNTED WITH FUEL BATTERY

(75) Inventor: Kouichi Tamura, Shizuoka-ken (JP)

(73) Assignee: Suzuki Motor Corporation, Hamamatsu-shi (JP)

( * ) Notice: Subject to any disclaimer, the term of this patent is extended or adjusted under 35 U.S.C. 154(b) by 275 days.

(21) Appl. No.: 12/657,546

(22) Filed: Jan. 22, 2010

(65) Prior Publication Data

US 2010/0258374 A1    Oct. 14, 2010

(30) Foreign Application Priority Data

Apr. 13, 2009  (JP) ................................. 2009-096677

(51) Int. Cl.
*B60K 11/06*  (2006.01)
(52) U.S. Cl. ........................................ 180/68.1; 429/120
(58) Field of Classification Search ................. 180/68.1, 180/68.2, 68.3, 309; 429/26, 34, 120
See application file for complete search history.

(56) References Cited

U.S. PATENT DOCUMENTS

| | | | |
|---|---|---|---|
| 8,048,554 B2 * | 11/2011 | Yang | 429/120 |
| 2005/0019632 A1 | 1/2005 | Horii et al. | |
| 2005/0255340 A1 * | 11/2005 | Watanabe et al. | 429/12 |
| 2007/0122671 A1 | 5/2007 | Shimizu et al. | |
| 2008/0166607 A1 | 7/2008 | Muramatsu et al. | |

FOREIGN PATENT DOCUMENTS

| | | |
|---|---|---|
| EP | 1 495 956 A2 | 1/2005 |
| EP | 1 793 446 A1 | 6/2007 |
| JP | 2008-213742 A | 9/2008 |

OTHER PUBLICATIONS

European Search Report for corresponding European Patent Application No. 10 15 8230 dated Jul. 12, 2010 (5 sheets).

* cited by examiner

*Primary Examiner* — John Walters
(74) *Attorney, Agent, or Firm* — Flynn, Thiel, Boutell & Tanis, P.C.

(57) ABSTRACT

A small vehicle mounted with a fuel battery employs a fan that outputs a satisfactory amount of air with small power consumption. An exhaust duct reduces pressure loss and airflow resistance. Hydrogen purged from the fuel battery is discharged out of the vehicle along with water through the exhaust duct. A fan box has a fan for introducing air into the fuel battery mounted on a frame constituting vehicle body. After cooling the fuel battery, air is exhausted out of the vehicle. The exhaust duct includes two parts; i.e., a first exhaust duct connected to the rear side of the fan box for introducing the air after cooling of the fuel battery; and a second exhaust duct connected to the rear side of the first exhaust duct for exhausting the air flowing thereinto from the first exhaust duct out of the vehicle body.

7 Claims, 4 Drawing Sheets

SMALL VEHICLE MOUNTED WITH FUEL BATTERY

FIELD OF THE INVENTION

The present invention relates to a small vehicle mounted with a fuel battery, particularly to a small vehicle mounted with a fuel battery that is provided with an exhaust duct for exhausting air with a smaller airflow resistance. After cooling the fuel battery, the air and hydrogen emitted from the fuel battery are exhausted outside the vehicle.

BACKGROUND OF THE INVENTION

There have been developed small vehicles like motorcycles and auto bicycles in which, in place of fossil fuel such as gasoline or the like, a fuel battery is mounted as an energy source therefor. In these small vehicles, electric power generated by a fuel battery mounted thereon is supplied to a motor to drive a drive wheel.

As disclosed in Japanese Patent Application Laid-Open Publication No. 2008-213742, in small vehicles mounted with a fuel battery, the fuel battery is disposed in front of a rear wheel, and a power unit equipped with a motor is attached to a frame so as to swing in a vertical direction with respect to the frame. The power unit is provided with a drainpipe for draining water generated within the fuel battery to the outside. The drainpipe is disposed inside and through the fuel battery, and extends up to and beyond the rear wheel. The drainpipe has a drain port formed at the rear end thereof to drain water while preventing the drained water from splashing onto a rider and/or vehicle body.

In a small vehicle mounted with a fuel battery, air is introduced to the fuel battery. The air introduced into the fuel battery has two functions; i.e., a function as an oxidizing agent for causing hydrogen to react within the fuel battery, and a function as a cooling medium for cooling the fuel battery. The air is introduced into the fuel battery using a fan. In order to increase the system efficiency, some fuel battery systems employ a fan, which introduces the air to the fuel battery with low power consumption, to control the fuel battery.

Conventionally a cylindrical pipe of a small diameter is used for the exhaust duct. However, in the conventional cylindrical pipe, the sectional area of the airflow path is too small causing a large pressure loss in the duct path. Therefore, there is a problem that a fan of small power consumption is not suitable for supplying a satisfactory amount of air to the fuel battery. Also, depending on the battery conditions, the fuel battery purges hydrogen to the air exhaust. The hydrogen has to be appropriately diluted and discharged out of the vehicle. Further, the air within the exhaust duct contains water (vapor) generated by the fuel battery. The water of condensed vapor has to be discharged out of the vehicle to prevent the water from being fed back to the fuel battery.

An object of the invention is to provide a small vehicle mounted with a fuel battery using a fan that provides a small output with a small power consumption, to supply a satisfactory amount of air to the fuel battery; and equipped with an exhaust duct capable of reducing the pressure loss and accordingly airflow resistance within, and discharging hydrogen purged from the fuel battery and water in the exhaust duct outwardly of the vehicle.

SUMMARY OF THE INVENTION

The invention is a small vehicle mounted with a fuel battery for generating electric power that is supplied to a motor for driving a drive wheel. The fuel battery is mounted on a frame constituting a vehicle body of the vehicle. The invention comprises: a fan box having a fan for introducing air into the fuel battery; and an exhaust duct for exhausting the air introduced by the fan after cooling the fuel battery. The exhaust duct is divided into two parts, a first exhaust duct connected to the rear side of the fan box for introducing air after cooling the fuel battery and a second exhaust duct connected to the rear side of the first exhaust duct and avoiding the frame for exhausting the air flowing thereinto from the first exhaust duct out of the vehicle body from the rear side thereof.

In the small vehicle mounted with a fuel battery according to the invention, the exhaust duct is divided into two parts to avoid the frame. Therefore, the exhaust duct is assembled easily even when the frame has a complicated structure. Thus, a maximum space for airflow is ensured in the exhaust duct.

Further, in the small vehicle mounted with the fuel battery according to the invention, a large space for the exhaust duct is ensured. Therefore, pressure loss and accordingly, the airflow resistance within the exhaust duct is reduced. Therefore, a fan of small capacity may be employed. Therefore, the electrical power consumption by the fan can be reduced, and the system efficiency of the fuel battery system can be increased.

DETAILED DESCRIPTION OF THE INVENTION

The present invention provides a small vehicle mounted with a fuel battery intended to achieve a smaller or reduced pressure loss at or along an exhaust duct by reducing the airflow resistance which results in smaller power consumption by a fan; and thereby, increase the efficiency of a fuel battery system.

Figure 6:
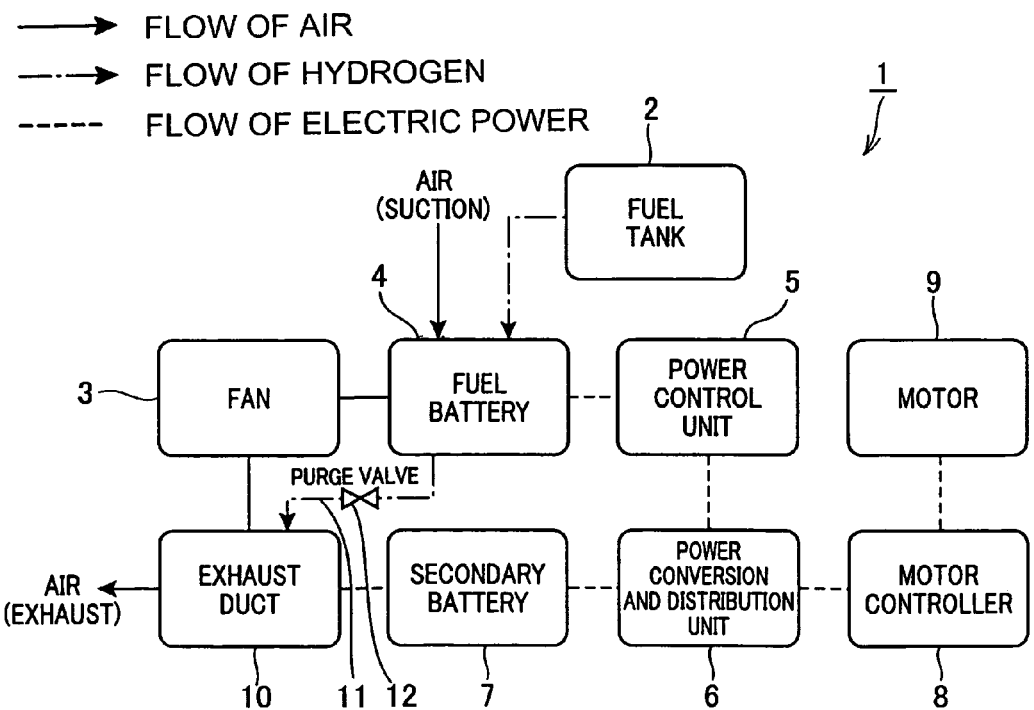
FIG. 6 is a block diagram of a fuel battery system.

Embodiments of the invention will be described below with reference to the drawings. In FIG. 6, a fuel battery system 1 supplies hydrogen stored in a fuel tank 2 and air sucked from the outside by a fan 3 to a fuel battery 4, to cause an electrochemical reaction to thereby generate electric power. Generated electric power is supplied to a power conversion and distribution unit 6 by a power control unit 5. The power conversion and distribution unit 6 supplies the electric power generated by the fuel battery 4 to a secondary battery 7 to charge the same with electric power. The electric power from the fuel battery 4 and/or the secondary battery 7 is supplied to a motor 9 through a motor controller 8 to drive the motor 9.

In the fuel battery system 1, temperature of the fuel battery 4 rises to a high degree due to hydrogen-oxygen reaction. A part of the air introduced by the fan 3 is circulated to cool down the fuel battery 4. After cooling the fuel battery 4, the air is exhausted through an exhaust duct 10. The hydrogen purged from the fuel battery 4 is discharged to the exhaust duct 10 through a hydrogen purge pipe 11. A purge valve 12 controls the flow rate and timing of the hydrogen purged through the hydrogen purge pipe 11.

Figure 7:
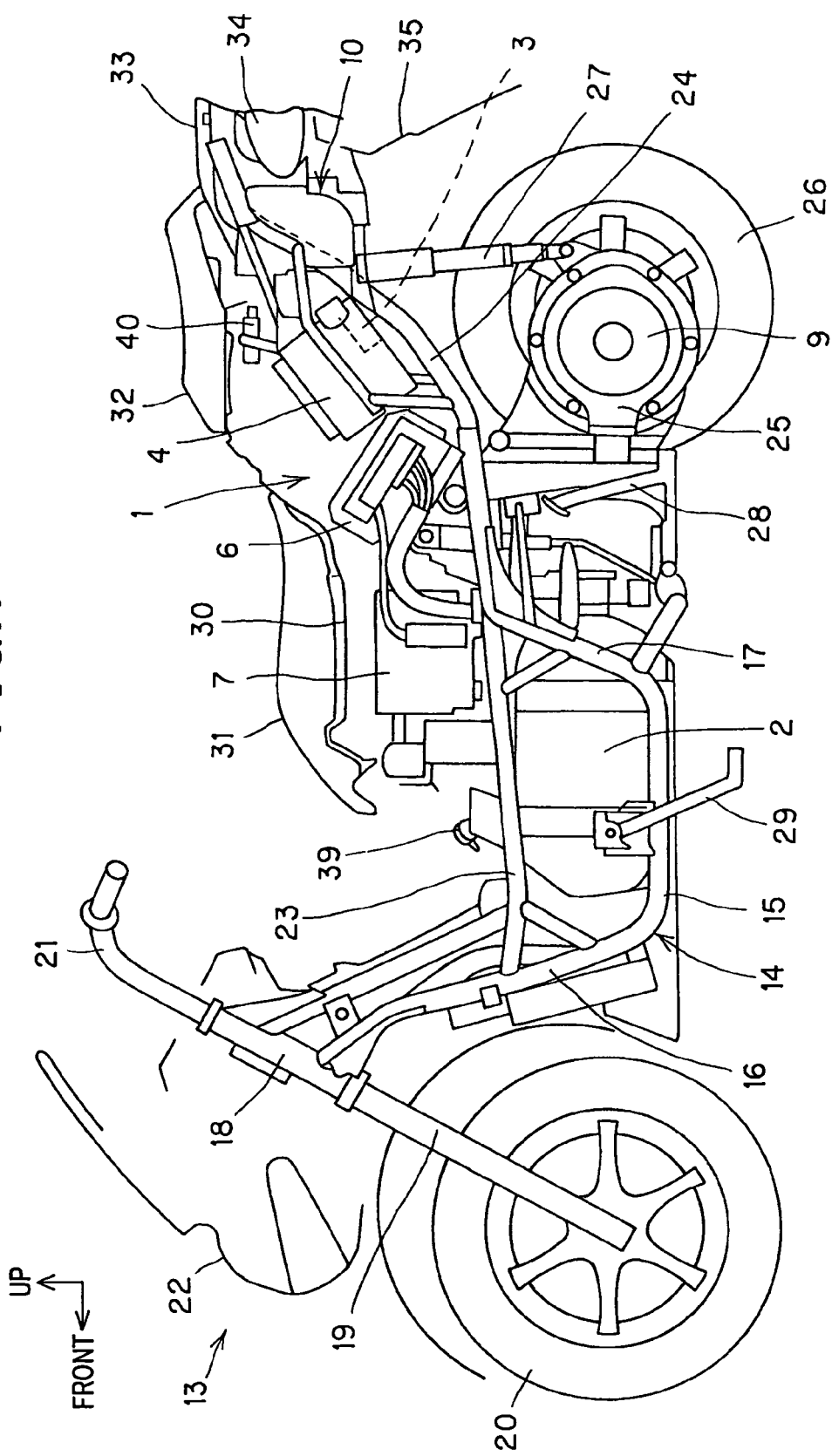
FIG. 7 is a side view of a small vehicle mounted with a fuel battery.

The fuel battery system 1 is mounted on a small vehicle (for example, a motorcycle) 13 as shown in FIG. 7. The small vehicle 13 has a pair of right and left main frames 14 constituting the vehicle body. The pair of main frames 14 are formed in a generally U-like shape with a pair of lower frame portions 15, a pair of front frame portions 16 and a pair of rear frame portions 17. The pair of lower frame portions 15 extend in a front-rear direction. The pair of front frame portions 16 extend sharply upward at an angle from the front side of the pair of lower frame portions 15. The pair of rear frame portions 17 extend sharply upward at an angle from the rear side of the pair of lower frame portions 15. The pair of rear frame portions 17 are bent in a half way, and then extend gently upward therefrom at an angle.

In the pair of right and left main frames 14, the pair of front frame portions 16 extend sharply upward and are attached to a head pipe 18, respectively at the front ends thereof. The head pipe 18 supports a front fork 19 so as to allow the front fork 19 to steer rightward/leftward. The front fork 19 pivots a front wheel 20 at the lower end thereof. A handlebar 21 is attached to an upper end of the front fork 19. A front cover 22 covers the head pipe 18.

In the pair of right and left main frames 14, a pair of upper frames 23 bridge between the pair of front frame portions 16 and the pair of rear frame portions 17 being connected at half way thereof, respectively. A pair of rear frames 24 connect at the rear end of the pair of rear frame portions 17, respectively. The pair of rear frames 24 curve upward at an angle and extend upward becoming gradually sharper toward the rear side, and then in the vicinity of the rear end thereof, gently extend straight upward at an angle. In the pair of main frames 14, the pair of rear frame portions 17 pivot the front end of a pair of swing arms 25. The pair of swing arms 25 pivot a rear wheel 26 as the drive wheel at the rear end thereof. A pair of rear suspensions 27 connect between the pair of swing arms 25 and the pair of rear frames 24 to support the pair of swing arms 25. In the pair of main frames 14, a center stand 28 is provided to the pair of lower frame portions 15 at the rear side thereof and a side stand 29 is provided at the left side thereof.

Figure 5:
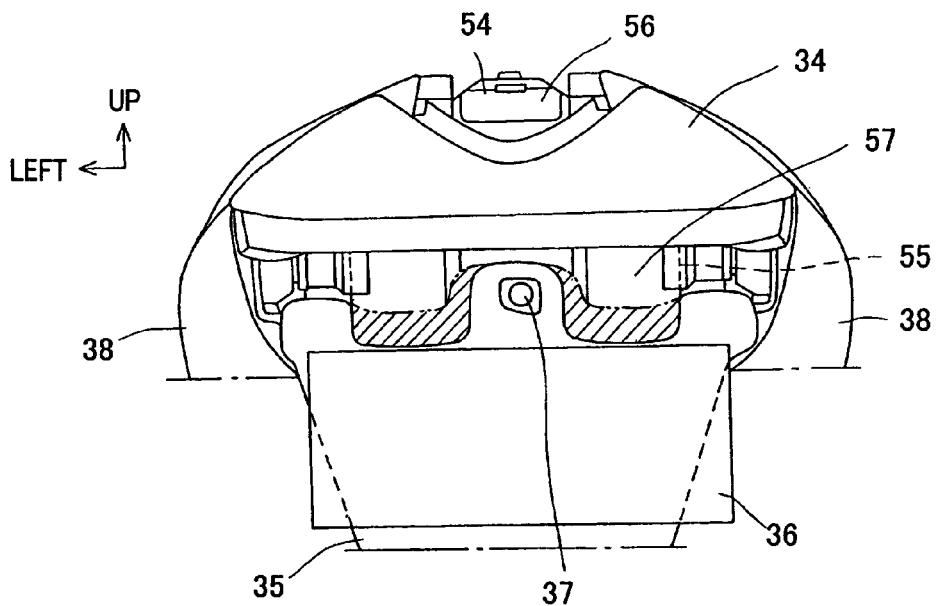
FIG. 5 is a back view of a small vehicle.

The pair of upper frames 23 and the rear frames 24 are provided with a main body 30 attached thereto in the upper side thereof, and a front seat 31 and a rear seat 32 are mounted thereon. A tail body 33 is attached to the pair of rear frames 24. A rear combination lamp 34 is attached to the tail body 33 in a lower portion thereof. A rear fender 35 is attached to the rear combination lamp 34 in a lower portion thereof. The rear fender 35 is provided with a number plate 36 and a number illumination lamp 37 for illuminating the number plate 36 as shown in FIG. 5. In FIG. 5, reference numeral 38 denotes a pair of right and left side fenders.

The small vehicle 13 is mounted with the fuel tank 2 for the fuel battery system 1 disposed between the pair of lower frame portions 15, the pair of front frame portions 16 and the pair of upper frames 23 connected to the pair of rear frame portions 17 in the pair of right and left main frames 14. The fuel tank 2 is provided with a hydrogen filling port 39. The power conversion and distribution unit 6 and the secondary battery 7 are mounted in an area above the pair of rear frame portions 17 and the pair of upper frames 23 and below the main body 30 in the pair of main frames 14. The fan 3, the fuel battery 4 and the exhaust duct 10 are mounted in an area above the pair of rear frames 24 and below the main body 30. The hydrogen sensor 40 is provided in an area above the fuel battery 4 and below the main body 30. The motor 9 is mounted on the pair of swing arms 25.

The small vehicle 13 is powered by driving the motor 9 using the electric power from the fuel battery 4 and/or the secondary battery 7 to rotate the rear wheel 26 as the drive wheel.

Figure 1:
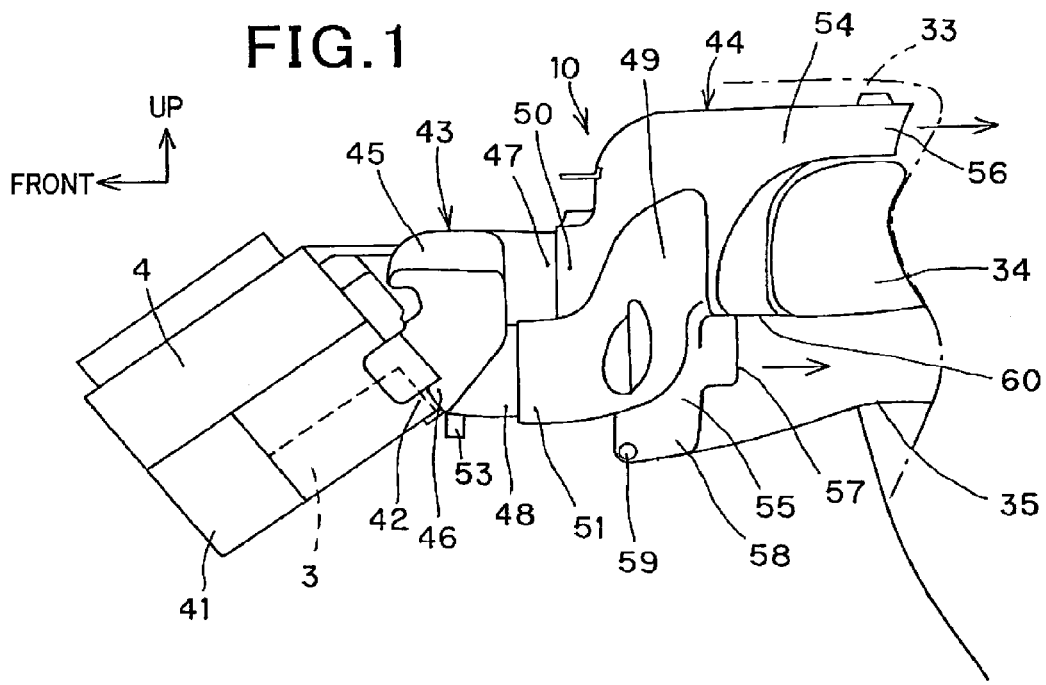
FIG. 1 is a side view of a small vehicle from which a tail body is removed therefrom.
Figure 2:
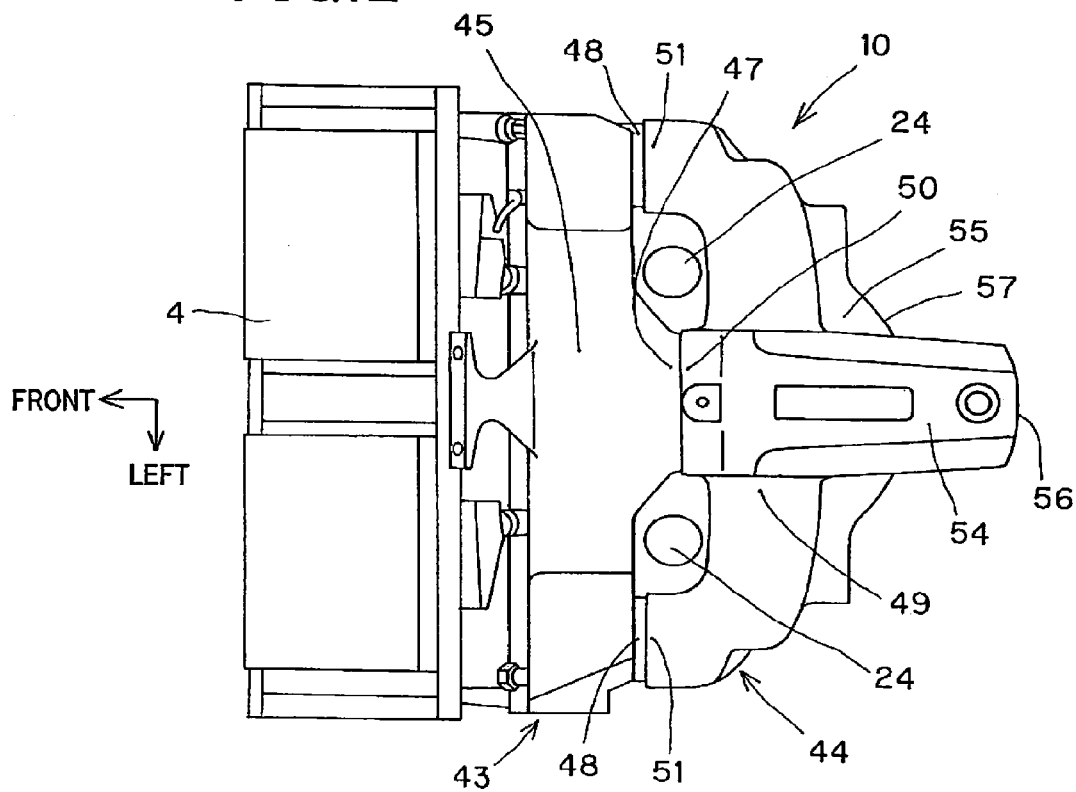
FIG. 2 is a plan view of a small vehicle from which tail body is removed therefrom.

In the small vehicle 13, the fuel battery 4 is mounted on the pair of rear frames 24 constituting the vehicle body as shown in FIG. 1 and FIG. 2. The fuel battery 4 is formed in a box-like shape, which is longer in the width direction of the vehicle. Under the fuel battery 4, a fan box 41 having a similar shape as the fuel battery 4 is attached to the pair of rear frames 24 being inclined downward toward the front side. In the fan box 41, the fan 3 is provided for introducing air to the fuel battery 4. An air outlet port 42 is formed behind the fan 3 in the fan box 41.

The small vehicle 13 is provided with the exhaust duct 10 for exhausting the air, which is introduced by the fan 3 to cool down the fuel battery 4. The exhaust duct 10 is constituted of two-divided parts; i.e., a first exhaust duct 43 and a second exhaust duct 44. The first exhaust duct 43 is connected to the rear side of the fan box 41 for guiding the air after cooling the fuel battery 4. The second exhaust duct 44 is connected to the rear side of the first exhaust duct 43 avoiding the pair of rear frames 24. The second exhaust duct 44 exhausts the air from the first exhaust duct 43 to the outside.

The first exhaust duct 43 has a box-like first body 45 extending in the width direction of the vehicle. The first body 45 is formed with a first inlet port 46 in the front side thereof being connected to the air outlet port 42 of the fan box 41. The first body 45 is formed with a first central outlet port 47 in a central rear thereof as viewed in the longitudinal direction. The first body 45 is formed with a first side outlet port 48 at both sides respectively, in a slightly lower portion in a rear area as viewed in the longitudinal direction.

The second exhaust duct 44 has a second body 49 having a box-like shape extending in the width direction of the vehicle, and each of the both sides thereof is curved forward. The second body 49 is formed with a second central inlet port 50 in a central area thereof, as viewed in the longitudinal direction, connected to the first central outlet port 47 of the first exhaust duct 43. The second body 49 is formed with a second side inlet port 51 in a front lower portion at both sides respectively, as viewed in the longitudinal direction thereof. The second side inlet port connects to the first side outlet port 48 of the first exhaust duct 43.

Figure 3:
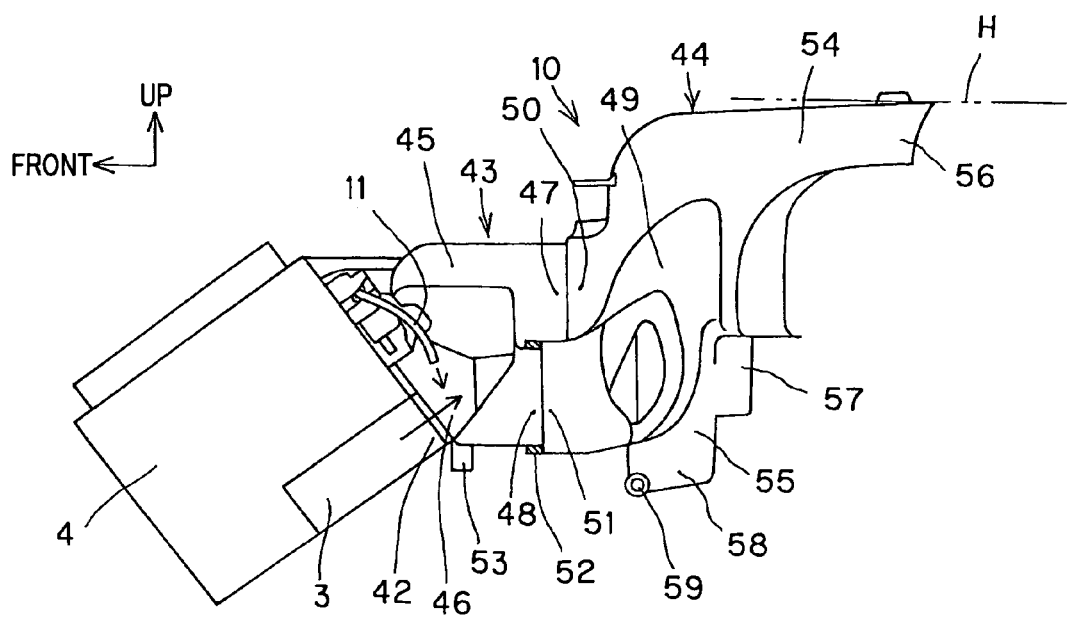
FIG. 3 is a side view of a fuel battery and an exhaust duct, a part of which is removed therefrom.

As shown in FIG. 3, in the second exhaust duct 44, the second central inlet port 50 is connected to the first central outlet port 47; and the second side inlet ports 51 connect to the first side outlet ports 48 of the first exhaust duct 43 respectively, being interposed by a seal 52.

In the small vehicle 13 mounted with the fuel battery 4 as described above, the exhaust duct 10 is divided into two parts: i.e., the first exhaust duct 43 and the second exhaust duct 44. Therefore, even when the frame has a complicated structure, the two-divided parts can easily connect to each other and avoid the pair of rear frames 24. A maximum space is ensured for the duct path under limitations due to the vehicle structure.

That is, as described above, the exhaust duct 10 is divided into the first exhaust duct 43 and the second exhaust duct 44. The first exhaust duct 43 is integrated with the fuel battery 4 and the fan box 41 as a module and assembled with the vehicle body first. After that, the second exhaust duct 44 is inserted into the first exhaust duct 43 from the rear side thereof. In order to avoid the pair of rear frames 24 as shown in FIG. 2, the exhaust duct 10 is arranged so that the first central outlet port 47 and two first side outlet ports 48 of the first exhaust duct 43 and the second central inlet port 50 and two second side inlet ports 51 of the second exhaust duct 44 are prepared separately and connected to each other afterward. Thus, the exhaust duct 10 is easily assembled with the vehicle body and a large space is ensured for the duct path.

Also, in the small vehicle 13 mounted with the fuel battery 4, a large space is ensured for the exhaust duct 10. Therefore, the exhaust duct 10 achieves a smaller pressure loss and thus a smaller airflow resistance. As a result, a fan 3 with a smaller output capacity may be employed; and accordingly, the fan 3 consumes less electric power. Thus, the fuel battery system 1 achieves higher system efficiency.

Further, in the small vehicle 13 mounted with the fuel battery 4, the first exhaust duct 43 and the second exhaust duct 44 are connected to each other and interposed by the seal 52. Therefore, air tightness in the connected portion is ensured to prevent air leakage therefrom, and thus the air after cooling the fuel battery 4 is prevented from being fed back into the vehicle body.

Figure 4:
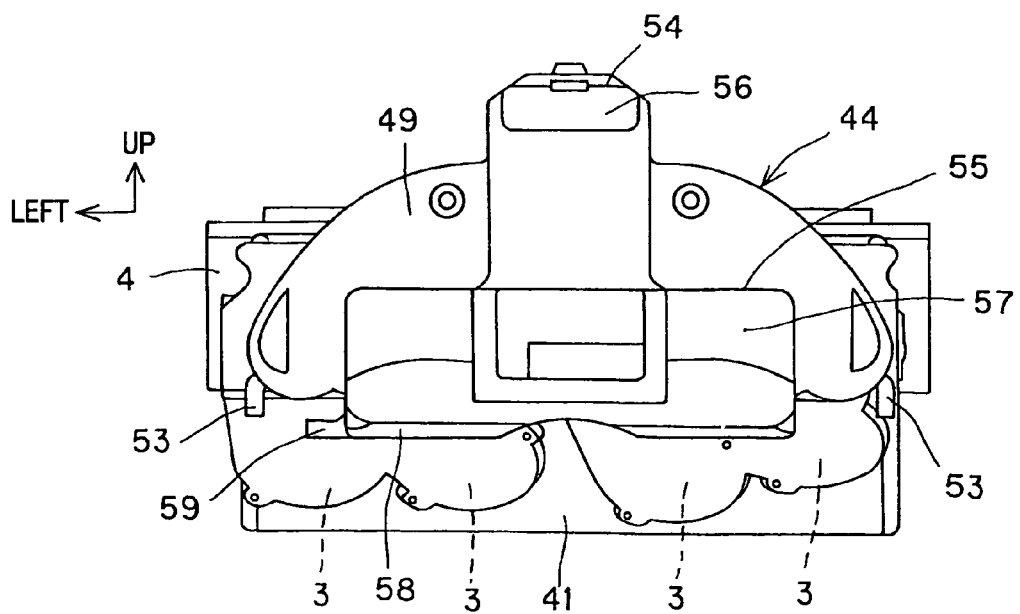
FIG. 4 is a back view of a fuel battery and exhaust duct.

Referring to FIG. 3 and FIG. 4, the first exhaust duct 43 is formed with a first side drain port 53 at both sides, respectively, as viewed in the longitudinal direction of the first body 45, in the lowermost portion thereof. Each of the first side drain ports 53 is provided for discharging water collected in the first body 45. The first exhaust duct 43 is provided with the hydrogen purge pipe 11 being opened thereto in the vicinity of the first inlet port 46 connected to the air outlet port 42 of the fan 3 as shown in FIG. 3. The hydrogen purge pipe 11 is provided to discharge the hydrogen purged from the fuel battery 4. The hydrogen purged from the hydrogen purge pipe 11 is carried into the first exhaust duct 43 by the air flowing into the first inlet port 46 through the air outlet port 42.

With this arrangement, in the small vehicle 13 mounted with the fuel battery 4, the hydrogen purged from the fuel battery system 1 is diffused swiftly by the airflow within the exhaust duct 10. Thus, the purged hydrogen is exhausted out, along with the air, from the rear side of the vehicle. Accordingly, the purged hydrogen is prevented from being fed back into the inside of the vehicle by external wind.

In the second exhaust duct 44, the rear side of the second body 49 is bifurcated into a second upper bifurcation 54 and a second lower bifurcation 55 as shown in FIG. 3 and FIG. 4. The second upper bifurcation 54 guides the air flowing into the first exhaust duct 43 upward in a central area as viewed in the width direction of the vehicle. The second lower bifurcation 55 guides the air downward to expand toward both sides thereof as viewed in the width direction of the vehicle. The second upper bifurcation 54 is formed with a second upper outlet port 56 opened to the rear side thereof in a central area as viewed in the width direction of the vehicle. The second lower bifurcation 55 is formed with a second lower outlet port 57, which expands to both sides of the upper outlet port as viewed in the width direction of the vehicle, and opens to the rear side of the vehicle. The second exhaust duct 44 is formed so that the second upper bifurcation 54 is inclined upward toward the rear side with respect to a horizontal line "H" in FIG. 3.

The second exhaust duct 44 is bifurcated into the second upper bifurcation 54 and the second lower bifurcation 55 to exhaust the air after cooling the fuel battery 4. By bifurcating the second exhaust duct 44 into the upper and lower two parts that avoid the rear combination lamp 34, a larger area is ensured for the duct path. The second upper outlet port 56 of the second upper bifurcation 54, which is the highest portion in the exhaust duct 10, is open. With this arrangement, even when the hydrogen remains within the exhaust duct 10 and when the fuel battery 4 and the fan 3 stop operating, the hydrogen can swiftly go out of the vehicle due to the buoyancy of the hydrogen itself, the specific gravity of which is less than that of air, without depending on the airflow.

In the small vehicle 13 mounted with the fuel battery 4, the second exhaust duct 44 is bifurcated into the upper and lower two parts and is opened to the rear side of the vehicle as described above. A large exhaust port is ensured while avoiding the rear combination lamp 34 constituting the rear part of the vehicle. Accordingly, the pressure loss of the air is reduced.

Further, in the small vehicle 13 mounted with the fuel battery 4, the second upper bifurcation 54, which is the highest portion within the exhaust duct 10, is open at the second upper outlet port 56. Even when the hydrogen remains being mixed with the air within the exhaust duct 10 after the fan 3 stops operating, the hydrogen, the specific gravity of which is less than that of the air, goes upward due to the buoyancy thereof and rises upward. Thus, the hydrogen is prevented from remaining within the exhaust duct 10.

Furthermore, in the small vehicle 13 mounted with the fuel battery 4, the second upper bifurcation 54 is inclined upward toward the rear side. Therefore, even after the fan 3 stops operating, the hydrogen, the specific gravity of which is less than that of air, is prevented from remaining within the exhaust duct 10.

The second exhaust duct 44 is formed so that the second upper bifurcation 54 is inclined upward toward the rear side of the vehicle as shown in FIG. 3 and FIG. 4. The second exhaust duct 44 is provided with a water reservoir 58 formed at the bottom of the second lower bifurcation 55 as viewed in the width direction of the vehicle. Further, a second water drain port 59 is provided for draining water received in the water reservoir 58 at the side that comes to the lower side when the vehicle is stayed or balanced on the side stand 29. In this embodiment, the drain port 59 is located at the left side that comes to the lower side when the vehicle is balanced on the side stand 29.

The water reservoir 58 of the second exhaust duct 44 receives water drops as a condensation of vapor, which is generated due to a reaction in the fuel battery 4 and rain water or the like entering from the outside. The water received by the water reservoir 58 is discharged to the outside through the second water drain port 59. The second water drain port 59 is provided at the left side of the water reservoir 58. When the small vehicle 1 is balanced on the side stand 29 located at the left side, the vehicle body is inclined leftward. With this, the received water is naturally drained from the left side. Different from the first exhaust duct 43, in the case where it is difficult to ensure a satisfactory water reservoir, by providing the first side drain port 53 at both right and left sides respectively, the water can be swiftly drained.

As described above, in the small vehicle 13 mounted with the fuel battery 4, the fuel battery 4 generates vapor due to the reaction therein and the vapor is condensed into water. Additionally, water enters into the second exhaust duct 44 from the outside. Such water is received by the water reservoir 58 and discharged outside of the vehicle through the second water drain port 59. Thus, water is prevented from being fed back into the fuel battery 4. When the vehicle is stayed or parked at an incline, the water is drained swiftly through the second water drain port 59 formed at a lower side while the vehicle is stayed or balanced on the side stand 29. In the small vehicle 13 mounted with the fuel battery 4, since the water is not trapped within the vehicle, the weight thereof is reduced.

In the second exhaust duct 44, the second upper bifurcation 54 and the second lower bifurcation 55 are formed so as to fit with and about the shape of the rear combination lamp 34 and the rear fender 35 as shown in FIG. 1.

With this arrangement, in the second exhaust duct 44, the second upper bifurcation 54 and the second lower bifurcation 55 are formed so as to fit with the rear combination lamp 34 and the rear fender 35 at a joint portion 60 therebetween and sealed to each other. As a result, the size and weight of the second exhaust duct 44 is reduced, resulting in a cost saving. Further, in the second exhaust duct 44, inversely proportional to the reduction of weight and thickness of the duct, the opening area of the exhaust port is increased. Since the airflow path is not limited by the thickness and outer wall, a larger space is ensured for the duct path.

The rear fender 35 is formed in a shape that fits with the shape of the second lower outlet port 57 of the second lower bifurcation 55 while avoiding the number illumination lamp 37 as shown in FIG. 5.

As described above, in the small vehicle 13 mounted with the fuel battery 4, the shape of the rear fender 35 is formed so as to fit with the shape of the opening of the second lower outlet port 57 to ensure or provide the opening marked with slash lines in FIG. 5. Therefore, a large opening is ensured for the second lower outlet port 57 without changing installation position of the number plate 36 and the number illumination lamp 37. As a result, airflow resistance is reduced without affecting the function of the number illumination lamp 37.

The invention ensures a maximum space for the exhaust duct path under the limitations due to the structure of the small vehicle mounted with fuel battery. The pressure loss and airflow resistance in the exhaust duct are reduced resulting in less electric power consumption by the fan to save electric power. The present invention is also applicable to electric bicycles driven by an air-cooled secondary battery with a cooling duct for providing electric power to a motor thereon.

What is claimed is:

1. A vehicle mounted with a fuel battery for generating electric power supplied to a motor for driving a drive wheel, the fuel battery being mounted on a frame acting as a vehicle body of the vehicle, comprising:
    a fan box having a fan for introducing air into the fuel battery; and
    an exhaust duct for exhausting the air introduced by the fan after cooling the fuel battery, wherein the exhaust duct is divided into two parts, comprising a first exhaust duct connected to a rear side of the fan box, for introducing air after cooling the fuel battery and a second exhaust duct connected to a rear side of the first exhaust duct, for exhausting air flowing thereinto from the first exhaust duct out of the vehicle body from the rear side thereof, wherein the second exhaust duct is bifurcated into two parts; a second upper bifurcation for guiding air flowing thereinto from the first exhaust duct in a central area thereof as viewed in a width direction of the vehicle and a second lower bifurcation expanding in both sides thereof for guiding air downward as viewed in the width direction of the vehicle,
    the second upper bifurcation being formed with a second upper outlet port opened to a rear side of the vehicle in a central area thereof as viewed in the width direction of the vehicle, and
    the second lower bifurcation being formed with a second lower outlet port expanding to both sides thereof as viewed in the width direction of the vehicle and being opened to the rear side of the vehicle.

2. The vehicle mounted with a fuel battery according to claim 1, wherein the first exhaust duct is formed with a first inlet port connected to an air outlet port of the fan box, and
    the first inlet port is provided with a hydrogen purge pipe opened in a vicinity thereof for discharging hydrogen purged from the fuel battery.

3. The vehicle mounted with a fuel battery according to claim 1, wherein the first exhaust duct is connected to the second exhaust duct and interposed by a seal therebetween.

4. The vehicle mounted with a fuel battery according to claim 1, wherein the second exhaust duct is formed so that the second upper bifurcation is inclined upward toward the rear side thereof.

5. The vehicle mounted with a fuel battery according to claim 1, wherein the second exhaust duct is provided with a water reservoir at a bottom of the second lower bifurcation, and a second water drain port for draining water received in the water reservoir at a side which moves to a lower position when the vehicle is inclined on a side stand.

6. The vehicle mounted with a fuel battery according to claim 1, wherein, in the second exhaust duct, the second upper bifurcation and the second lower bifurcation are formed so as to fit with a shape of a rear combination lamp and a rear fender.

7. The vehicle mounted with fuel battery according to claim 6, wherein the rear fender is formed so as to fit with a shape of the second lower outlet port of the second lower bifurcation for avoiding a number illumination lamp.

* * * * *